US006999571B2

(12) United States Patent  (10) Patent No.: US 6,999,571 B2
Du  (45) Date of Patent: Feb. 14, 2006

(54) DEVICE AND METHOD FOR PLAYING A RING SIGNAL BASED ON A MEDIATE RING INFORMATION IN A COMMUNICATION APPARATUS

(75) Inventor: Ben-Chuan Du, Taoyuan (TW)

(73) Assignee: Benq Corporation, Taoyuan (TW)

( * ) Notice: Subject to any disclaimer, the term of this patent is extended or adjusted under 35 U.S.C. 154(b) by 223 days.

(21) Appl. No.: 10/614,809

(22) Filed: Jul. 9, 2003

(65) Prior Publication Data

US 2004/0101129 A1 May 27, 2004

(30) Foreign Application Priority Data

Jul. 8, 2002 (TW) ................................ 91115105 A

(51) Int. Cl.
H04M 3/42 (2006.01)
H04M 1/00 (2006.01)
H04M 3/00 (2006.01)
(52) U.S. Cl. .............................. 379/207.16; 379/373.02
(58) Field of Classification Search ................................
379/373.01–373.04, 374.01, 374.02, 375.01, 379/418, 207.16; 455/414.1, 567
See application file for complete search history.

(56) References Cited

U.S. PATENT DOCUMENTS 4,694,482 A * 9/1987 Reesor et al. ............. 379/27.01
5,526,406 A * 6/1996 Luneau ...................... 455/563
6,385,303 B1 * 5/2002 Peterson et al. ............ 379/67.1
6,618,473 B1 * 9/2003 Davis ..................... 379/142.05
6,711,239 B1 * 3/2004 Borland ..................... 379/67.1
6,804,338 B1 * 10/2004 Chen ...................... 379/142.08
2002/0094076 A1 * 7/2002 Chen ...................... 379/373.01
2002/0128033 A1 * 9/2002 Burgess ..................... 455/528
2003/0135377 A1 * 7/2003 Kurianski et al. .......... 704/500
2004/0137929 A1 * 7/2004 Jones et al. ................. 455/517
2004/0204147 A1 * 10/2004 Nielsen ...................... 455/567

* cited by examiner

Primary Examiner—Benny Q. Tieu
(74) Attorney, Agent, or Firm—Ladas & Parry LLP

(57) ABSTRACT

The invention provides a device, used in a communication apparatus, for generating a mediate ring information and playing a ring signal based on the mediate ring information. The device comprises a receiving module, a processing module, an analyzing module, a storage module and a playing module. The receiving module receives an audio digital signal. The processing module divides the audio digital signal into a plurality of sub-signals in a predetermined period and then transfers the plurality of sub-signals into a plurality of sets of frequency spectrums. The analyzing module retrieves at least one frequency with largest amplitude in each of the plurality of sets of frequency spectrums respectively, and stores the retrieved frequencies in series to generate the mediate ring information. The storage module stores the mediate ring information and a plurality of predetermined tone information. The playing module retrieves the mediate ring information and one of the plurality of predetermined tone information from the storage module, generates the ring signal based on the mediate ring information and the retrieved predetermined tone information, and then plays the ring signal.

11 Claims, 2 Drawing Sheets

DEVICE AND METHOD FOR PLAYING A RING SIGNAL BASED ON A MEDIATE RING INFORMATION IN A COMMUNICATION APPARATUS

FIELD OF THE INVENTION

This invention relates to a device used in a communication apparatus; in particular, a device for generating a mediate ring information and playing a ring signal base on the mediate ring information.

BACKGROUND OF THE INVENTION

The communication devices nowadays, such as telephones, cell phones and PDAs, provide various kinds of ring signals and respond to different incoming calls from different calling parties by different ring signals. Therefore, the subscriber of the communication device can recognize the calling party by the ring signal. Please refer to U.S. Pat. Nos. 5,481,599 and 5,854,826 for the related prior art.

The prior art pre-stores a variety of ring signals so that it can be responsive to different incoming calls. However, it takes a lot of memory of the communication device to pre-store a variety of ring signals. Also, the subscriber cannot edit the ring signals. Therefore, the prior art methods can not satisfy the subscriber's need for quality, variety and personalization.

Some prior art communication apparatuses have a recorder device for recording the external audio sounds into an audio signal and they can play a ring signal from the audio signal recorded. However, such communication apparatuses require a lot of memory capacity but provide limited kinds of ring signals with poor quality.

Some prior art communication apparatuses have ring-editing function. The users input musical notes to edit the ring signals by an inputting device of the communication apparatus. Such method does not take a lot of internal memory, but it is time consuming. Furthermore, it is hard to edit complex ring signals.

The objective of the invention is to provide a device used in an communication apparatus, for converting the audio signals that take a lot memory into the mediate ring information that take little memory, and for playing a ring signal based on the mediate ring information. The mediate ring information can be edited by the subscriber for personalization.

SUMMARY OF THE INVENTION

The invention provides a device, used in a communication apparatus, for converting the audio signals into the mediate ring information and playing a ring signal based on the mediate ring information. The mediate ring information can be edited by the subscriber.

According to a preferred embodiment of the present invention, the device, used in the communication apparatus, generates a mediate ring information and plays a ring signal base on the mediate ring information. The device comprises a receiving module, a processing module, an analyzing module, a first storage module, a second storage module and a playing module. The receiving module receives an audio digital signal. The processing module divides the audio digital signal into a plurality of sub-signals in a predetermined period, and respectively transfers the plurality of sub-signals into a plurality of sets of frequency spectrums. The analyzing module respectively retrieves at least one frequency with largest amplitude in each of the plurality of sets of frequency spectrums and stores the retrieved frequencies in series to generate the mediate ring information. The first storage module stores the mediate ring information. The second storage module stores a plurality of predetermined tone information. The playing module retrieves the mediate ring information and one of the plurality of predetermined tone information from the first storage module, generates the ring signal based on the retrieved mediate ring information and the retrieved predetermined tone information, and plays the ring signal.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

The objective of the invention is to provide a device, used in a communication apparatus, for converting the audio signals into the mediate ring information and playing a ring signal based on the mediate ring information. The mediate ring information can be edited by the subscriber of the communication apparatus. The invention can satisfy the subscriber's need for quality and a variety of ring signals and personalization. The followings will detail describe the spirits and applications of the preferred embodiment according to the present invention.

Figure 1:
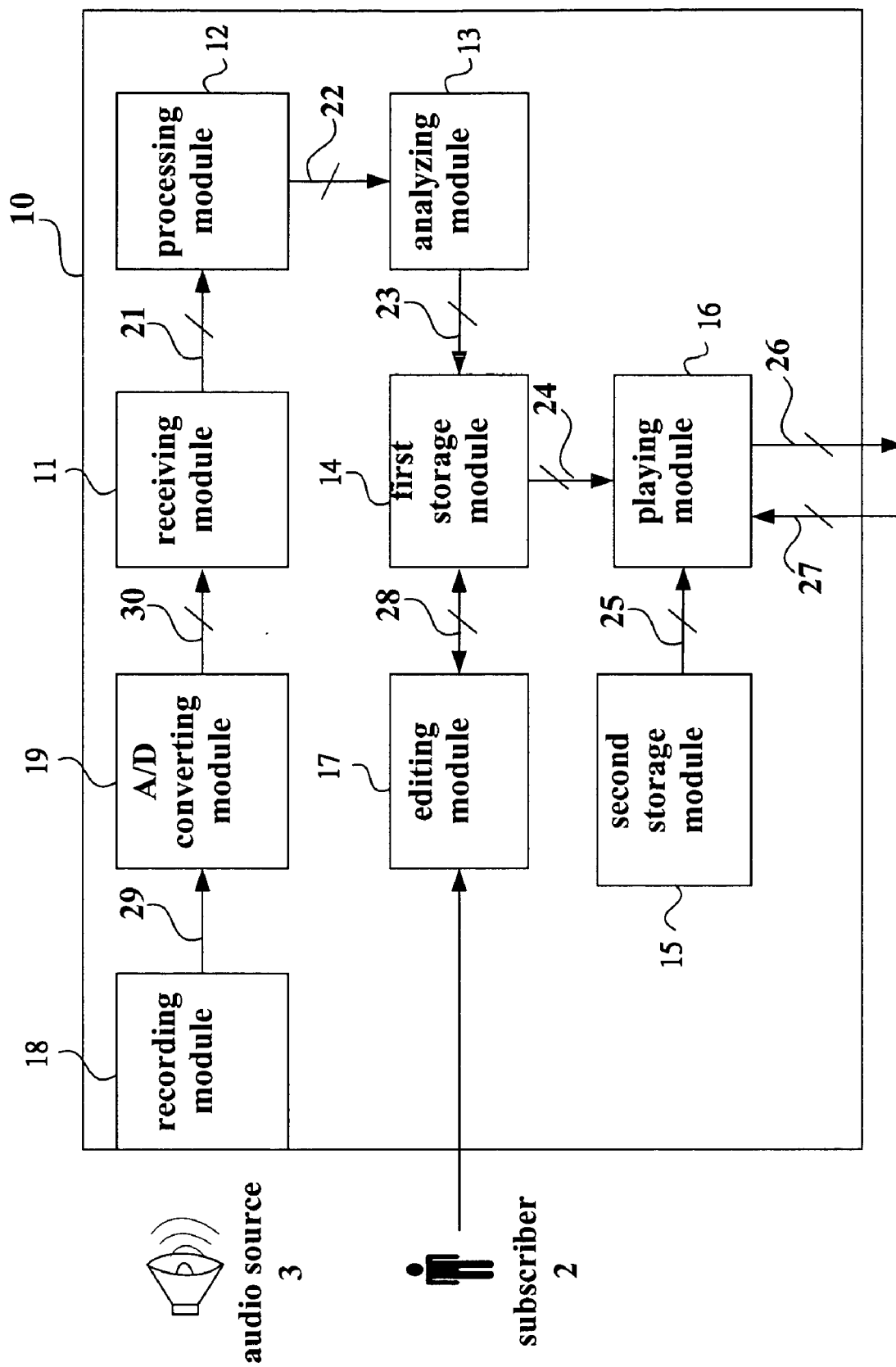
FIG. 1 is a block diagram of a device according to the present invention.

Please refer to FIG. 1. FIG. 1 is a block diagram of a device 10 according to the present invention. The device 10 is used in a communication apparatus, not shown.

The device 10 generates a mediate ring information Rm and plays a ring signal Rf based on the mediate ring information Rm. The device 10 comprises a receiving module 11, a processing module 12, an analyzing module 13, a first storage module 14, a second storage module 15 and a playing module 16.

The receiving module 11 is for receiving an audio digital signal Ad. The processing module 12 receives the audio digital signal Ad from the receiving module 11 via a signal line 21. After receiving the audio digital signal Ad, the processing module 12 divides the audio digital signal Ad into a plurality of sub-signals in a predetermined period, and respectively transfers the plurality of sub-signals into a plurality of sets of frequency spectrums.

In one embodiment, the processing module 12 respectively transfers the plurality of sub-signals into the plurality of sets of frequency spectrums by a Fast Fourier transformation (FFT).

The analyzing module 13 receives the plurality of sets of transferred frequency spectrums via a signal line 22. The analyzing module 13 retrieves at least one frequency with largest amplitude in each of the plurality of sets of frequency spectrums, respectively, and stores the retrieved frequencies in series to generate the mediate ring information Rm. The mediate ring information Rm is stored in the first storage module 14 via a signal line 23. The second storage module 15 stores a plurality of predetermined tone information Rt. In contrast to the prior art that takes a lot of memory for storing ring informations, the mediate ring information Rm and the tone information Rt stored in the device 10 according to the invention occupy little memory.

When the communication apparatus (not shown in drawings) receives an incoming call and plays the ring signal with the device 10, the playing module 16 of device 10 responds to the incoming call received by the communication apparatus. The playing module 16 retrieves the mediate ring information Rm from the first storage module 14 via a signal line 24 and one of the plurality of predetermined tone information Rt from the second storage module 15 via the signal line 25. The playing module 16 generates the ring signal based on the retrieved mediate ring information Rm and the retrieved predetermined tone information Rt. Then, the playing module 16 plays the ring signal Rf and the ring signal Rf is transmitted out via a signal line 26. The communication apparatus plays the ring signal Rf with a playing device such as a speaker.

The predetermined tone information Rt stored in the second storage module 15 may comprise monotone, such as piano or trumpet, or chord. The first storage module 14 stores a plurality of mediate ring information Rm. The playing module 16 retrieves the mediate ring information Rm and the predetermined tone information Rt base on the subscriber's 2 selection or prior configuration. The retrieved mediate ring information Rm can represent the music score of the ring signal. Therefore, the device 10 of the invention provides quality and variety of ring signals.

When receiving the incoming call, the communication apparatus sends a command to the playing module 16 via the signal line 27, as showed in FIG. 1. The playing module 16 is triggered by the command to generate and play the ring signal responsive to the incoming call. The command comprises selection information for the mediate information Rm and the tone information Rt. Based on the selection information, the playing module 16 retrieves the mediate ring information Rm from the first storage module 14 and the tone information Rt from the second storage module 15.

As showed in FIG. 1, the device 10 further includes an editing module 17 for personalization of the subscriber or user. The editing module 17 is capable of selectively editing the mediate ring information. After the mediate ring information Rm stored in the first storage module 14 and before the ring signal Rt played by the playing module 16, the subscriber 2 of communication apparatus can edit the mediate ring information Rm by the editing module 17. By the way, the subscriber 2 of communication apparatus can edit the mediate ring information Rm according to his/her requirement or preference.

To get a variety of audio digital signals Ad and to pre-stores a variety of mediate ring information Rm, the device 10 further comprises a recording module 18 and an analog/digital converting module 19. The recording module 18 is for recording an external audio source 3 into an audio analog signal, and transmitting the audio analog signal to the analog/digital converting module 19 via a signal line 29. The analog/digital converting module 19 is for converting an audio analog signal into a audio digital signal Ad, which can be received by the receiving module 11, and transmitting the audio digital signal Ad to the receiving module 11 via a signal line 30.

Following will describe the signal converting and processing of the device 10 according to the preferred embodiment of the invention. The signal converting and processing are used for a communication apparatus and to generate the mediate ring information Rm and play the ring signal base on the mediate ring information Rm. A plurality of the predetermined tone information Rt is provided in advance.

Figure 2:
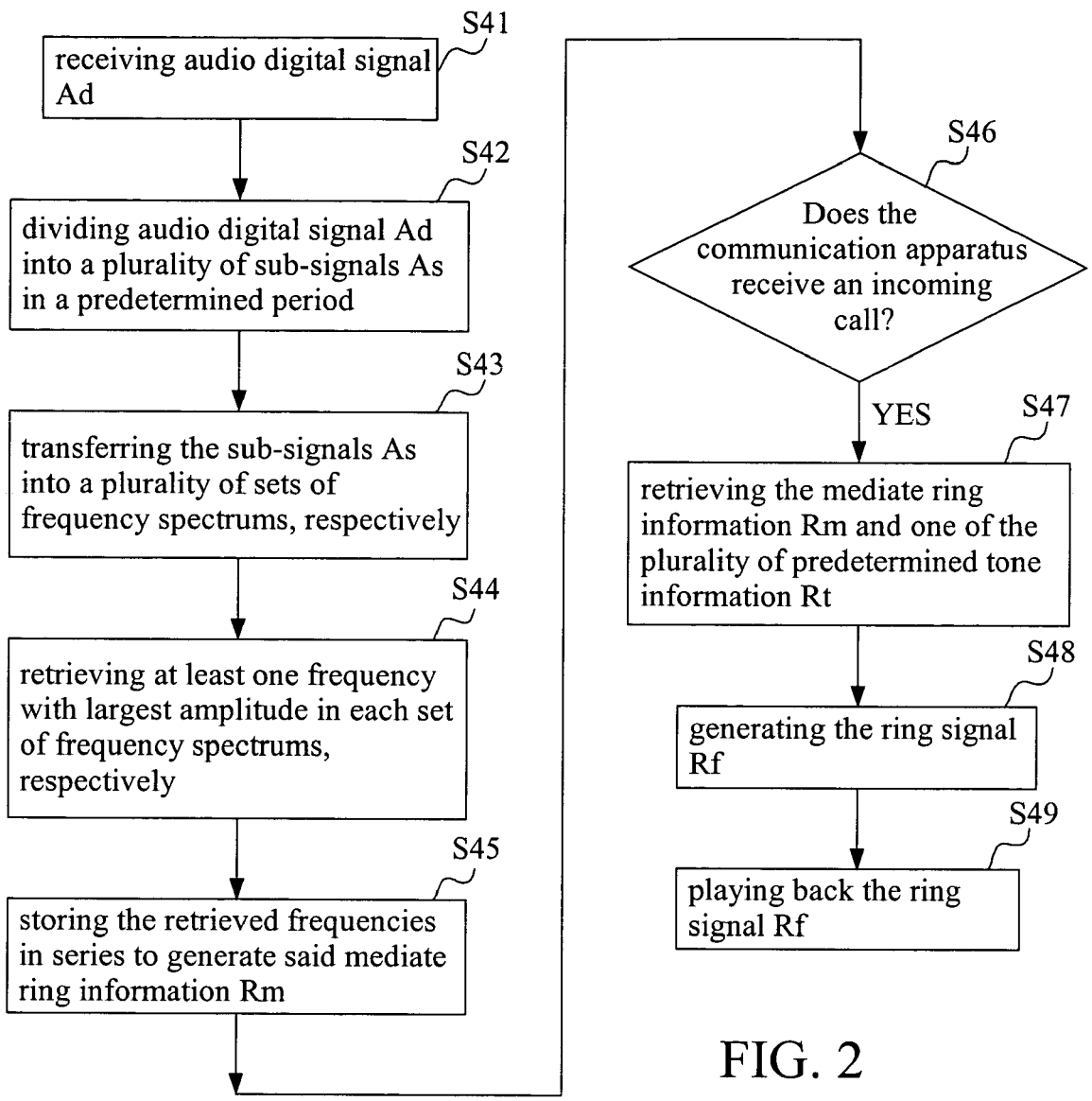
FIG. 2 is a flowchart of the signal converting and processing a according to the present invention.

Please refer to FIG. 2. FIG. 2 is a flowchart of the signal converting and processing a according to the present invention. According to the present invention, a method for generating a mediate ring information and generating a ring signal based on the mediate ring information in a communication apparatus comprises the steps of:

S41: receive the audio digital signal Ad.

S42: divide the audio digital signal Ad into a plurality of sub-signals in a predetermined period.

S43: respectively transfer the plurality of sub-signals into the plurality of sets of frequency spectrums.

S44: respectively retrieve at least one frequency with largest amplitude in each of the sets of frequency spectrums.

S45: store the retrieved frequencies in series to generate the mediate ring information Rm.

S46: wait for receiving the incoming ring by the communication apparatus.

S47: receive the mediate ring information Rm and one of predetermined tone information Rt.

S48: generate the ring signal based on the retrieved mediate ring information Rm and the retrieved tone information Rt.

S49: play the ring signal.

For the subscriber's personalization, between the S45 step and the S46 step the method further provides an editorial function to edit the mediate ring information Rm for the subscriber.

In one preferred embodiment, before the S41 step, the method comprises a step to record an external audio source into an audio analog signal and convert the audio analog signal into the audio digital signal. Therefore, the subscriber can get a variety of audio digital signals Ad, and hence pre-store a variety of the mediate ring information Rm. So, the subscriber of communication apparatus can edit the mediate information Rm according to her/her requirement or preference.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A device, used in a communication apparatus, for generating a mediate ring information and playing a ring signal based on said mediate ring information, said device comprising:

a receiving module for receiving an audio digital signal;

a processing module for dividing the audio digital signal into a plurality of sub-signals in a predetermined period, and transferring the plurality of sub-signals into a plurality of sets of frequency spectrums, respectively;

an analyzing module for retrieving at least one frequency with the largest amplitude in each of the plurality of sets of frequency spectrums, respectively, and storing the retrieved frequencies in series to generate said mediate ring information;

a storage module for storing the mediate ring information and a plurality of predetermined tone information; and a playing module for retrieving the mediate ring information and one of the plurality of predetermined tone information from the storage module, generating the ring signal based on the retrieved mediate ring information and the retrieved predetermined tone information, and playing the ring signal.

2. The device of claim 1, further comprising an editing module capable of selectively editing the mediate ring information.

3. The device of claim 1, further comprising:
a recording module for recording an external audio source into an audio analog signal; and
an analog/digital converting module for converting the audio analog signal into the audio digital signal.

4. The device of claim 1, wherein the processing module performs the transferring of the plurality of sub-signals into the plurality of sets of frequency spectrums, respectively, by a fast Fourier transformation (FFT).

5. The device of claim 1, wherein the storage module comprises a first storage module and a second storage module, the first storage module functions storing said mediate ring information, and the second storage module functions storing the plurality of predetermined tone information.

6. The device of claim 1, wherein the playing module, responsive to an incoming call received by the communication apparatus, functions retrieving said mediate ring information and one of the plurality of predetermined tone information from the storage module, generating the ring signal based on the retrieved mediate ring information and the retrieved predetermined tone information, and playing the ring signal.

7. A method for generating a mediate ring information and generating a ring signal based on the mediate ring information in a communication apparatus, a plurality of predetermined tone information being previously provided, the method comprising the steps of:

(a) receiving an audio digital signal;
(b) dividing the audio digital signal into a plurality of sub-signals in a predetermined period;
(c) transferring the plurality of sub-signals into a plurality of sets of frequency spectrums, respectively;
(d) retrieving at least one frequency with the largest amplitude in each of the plurality of sets of frequency spectrums, respectively;
(e) storing the retrieved frequencies in series to generate the mediate ring information; and
(f) retrieving the mediate ring information and one of the plurality of predetermined tone information, and generating the ring signal based on the retrieved mediate ring information and the retrieved predetermined tone information.

8. The method of claim 7, between the step (e) and the step (f), further comprising the step of:
(f-1) selectively editing the mediate ring information.

9. The method of claim 7, before the step (a), further comprising the steps of:
(a-1) recording an external audio source into an audio analog signal; and
(a-2) converting the audio analog signal into the audio digital signal.

10. The method of claim 7, wherein the step (c) is performed by a fast Fourier transformation (FFT).

11. The method of claim 7, wherein the step (f) is performed in response to an incoming call received by the communication apparatus, and after the step (f), further comprising the step of playing said ring signal.

* * * * *